United States Patent
Lee et al.

(10) Patent No.: US 8,379,585 B2
(45) Date of Patent: Feb. 19, 2013

(54) METHOD OF TRANSMITTING SEMI-PERSISTENT SCHEDULING DATA IN MULTIPLE COMPONENT CARRIER SYSTEM

(75) Inventors: Young Dae Lee, Anyang-si (KR); Sung Jun Park, Anyang-si (KR); Seung June Yi, Anyang-si (KR); Sung Duck Chun, Anyang-si (KR)

(73) Assignee: LG Electronics Inc., Seoul (KR)

( * ) Notice: Subject to any disclaimer, the term of this patent is extended or adjusted under 35 U.S.C. 154(b) by 293 days.

(21) Appl. No.: 12/914,486

(22) Filed: Oct. 28, 2010

(65) Prior Publication Data

US 2011/0103327 A1    May 5, 2011

Related U.S. Application Data

(60) Provisional application No. 61/256,294, filed on Oct. 29, 2009.

(51) Int. Cl.
*H04W 4/00* (2009.01)

(52) U.S. Cl. .................................................. 370/329
(58) Field of Classification Search .................. None
See application file for complete search history.

(56) References Cited

U.S. PATENT DOCUMENTS

| | | | |
|---|---|---|---|
| 2011/0093756 A1* | 4/2011 | Yang et al. | 714/748 |
| 2011/0116467 A1* | 5/2011 | Jung et al. | 370/329 |
| 2012/0230238 A1* | 9/2012 | Dalsgaard et al. | 370/311 |

* cited by examiner

*Primary Examiner* — John Blanton
(74) *Attorney, Agent, or Firm* — Morgan, Lewis & Bockius LLP (57) ABSTRACT

A method of receiving semi-persistent scheduling (SPS) data performed by a user equipment (UE) in a multi-carrier system is provided. The method includes receiving, on a first carrier, information on a second carrier for second SPS data, the second carrier different from the first carrier, and receiving the second SPS data on the second carrier. The network can implicitly reconfigure the SPS from one CC to another CC without releasing the old SPS configuration in the one CC and setting up a new SPS configuration for the another CC, so that the complexity of SPS reconfiguration procedure is simplified and clarified.

15 Claims, 10 Drawing Sheets

METHOD OF TRANSMITTING SEMI-PERSISTENT SCHEDULING DATA IN MULTIPLE COMPONENT CARRIER SYSTEM

CROSS-REFERENCE TO RELATED APPLICATIONS

This application claims the benefit of priority of U.S. Provisional Application No. 61/256,294 filed on Oct. 29, 2009 which is incorporated by reference in their entirety herein.

BACKGROUND

1. Field of the Invention

The present invention is related to a wireless communication system, more particularly to a method of transmitting semi-persistent scheduling data in multiple component carrier system.

2. Related Art

Wireless communication systems are widely deployed in order to provide various kinds of communication services, such as voice and data. In general, the wireless communication systems are multiple access systems which can share available system resources (e.g., bandwidths and transmission power) and support communication with multiple users. The multiple access systems can include, for example, a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

In a common wireless communication system, although the bandwidth of uplink and the bandwidth of downlink are differently set up, only one carrier is taken into consideration. Even in 3rd Generation Partnership Project (3GPP) Long Term Evolution (LTE), the number of carriers constituting uplink and downlink is 1, and the bandwidth of uplink and the bandwidth of downlink bandwidth are in general symmetrical to each other on the basis of a single carrier. However, it is not easy to allocate a large frequency bandwidth except some regions in the world. Accordingly, in order to efficiently use small sliced bands, a carrier aggregation technique for producing the same effect as that a logically large band is used by binding a plurality of physically non-continuous bands in the frequency domain is being developed. The carrier aggregation technique includes, for example, a technique in which system bandwidth of 100 MHz is supported by using multiple carriers.

For the effective use of limited radio resources, a base station (BS) dynamically schedules the radio resources. When there is no data packet transmitted using radio resources allocated to a user, the BS performs scheduling such that unused radio resources can be used by another user. Thus, the radio resources can be further effectively used. As such, radio resources may not be allocated to a user who does not have a data packet to be transmitted/received. In this manner, the radio resources can be dynamically allocated on a frequency domain or a time domain. Such a scheme is referred to as dynamic scheduling. Dynamic scheduling is efficient for service types such as transmission control protocol (TCP) or the signaling radio bearers (SRBs), in which the traffic is bursty and dynamic in rate.

In addition to the dynamic scheduling, semi-persistent scheduling (SPS) is defined. SPS enables radio resources to be semi-statically configured and allocated to a UE for a longer time period than one subframe, avoiding the need for specific downlink assignment messages or uplink grant messages for each subframe. SPS is useful for services such as voice over internet protocol (VoIP) for which the data packets are small, periodic and semi-static in size. For this kind of service the timing and amount of radio resources needed are predictable.

Aggregation of multiple component carriers is mainly used for higher-rate service. Therefore, it seems unnecessary that SPS is applied to over more than two carriers.

SUMMARY

The present invention provides a method of transmitting semi-persistent scheduling data in multiple component carrier system.

According to an aspect of the present invention, a method of receiving semi-persistent scheduling (SPS) data performed by a user equipment (UE) in a multi-carrier system is provided. The method includes receiving, on a first carrier, information on a second carrier for second SPS data, the second carrier different from the first carrier, and receiving the second SPS data on the second carrier.

According to another aspect of the present invention, a method of transmitting semi-persistent scheduling (SPS) data performed by a network in a multi-carrier system is provided. The method includes transmitting, on a first carrier, information on a second carrier for second SPS data, the second carrier different from the first carrier, and transmitting the second SPS data on the second carrier.

According to the present invention, the network can implicitly reconfigure the SPS from one CC to another CC without releasing the old SPS configuration in the one CC and setting up a new SPS configuration for the another CC, so that the complexity of SPS reconfiguration procedure is simplified and clarified.

DESCRIPTION OF EXEMPLARY EMBODIMENTS

Some embodiments of the present invention will now be described in detail with reference to the accompanying drawings. It is to be noted that in assigning reference numerals to respective constituent elements in the drawings, the same reference numerals designate the same constituent elements although the constituent elements are shown in different drawings. Further, in describing the embodiments of the present invention, a detailed description of pertinent known constructions or functions will be omitted if it is deemed to make the gist of the present invention unnecessarily vague.

Further, in this specification, a wireless communication network is chiefly described. However, tasks performed in the wireless communication network can be performed in a process of a network managing system (e.g., a base station), such as controlling the wireless communication network and sending data, or can be performed in a mobile station coupled to the corresponding wireless communication network.

Figure 1:
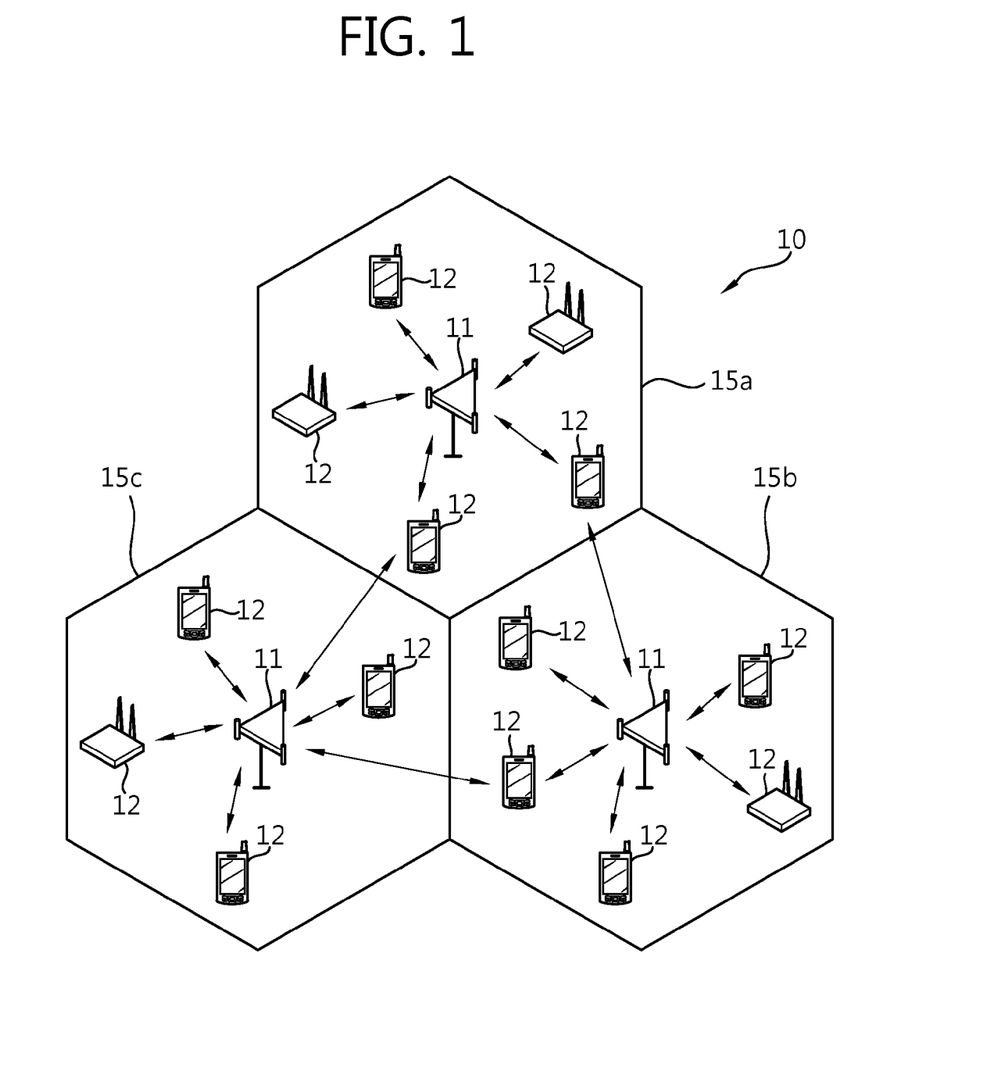
FIG. 1 is a diagram showing a wireless communication system.

FIG. 1 is a diagram showing a wireless communication system.

Referring to FIG. 1, a wireless communication system 10 is broadly deployed to provide various communication services such as voice, packet data.

The wireless communication system 10 includes at least one Base Station (hereinafter referred to as 'BS') 11. The BSs 11 provide communication services to respective geographical areas (in general, called 'cells') 15a, 15b, and 15c. The cell can be divided into a plurality of areas (called 'sectors').

A Mobile Station (hereinafter referred to as an 'MS') 12 can be fixed and mobile and also referred to as another terminology, such as a User Equipment (UE), a Mobile Terminal (MT), a User Terminal (UT), a Subscriber Station (SS), a wireless device, a Personal Digital Assistant (PDA), a wireless modem, or a handheld device.

The BS 11 commonly refers to a fixed station which communicates with the MSs 12, and it can be referred to as another terminology, such as an evolved-NodeB (eNB), a Base Transceiver System (BTS), or an access point (AP). The cell should be comprehensively interpreted to indicate some frequencies provided by the BS 11. The cell includes a variety of coverage areas, such as a mega cell, a macro cell, a micro cell, a pico cell, and a femto cell.

Hereinafter, downlink refers to communication from the BS 11 to the MS 12, and uplink refers to communication from the MS 12 to the BS 11. In the downlink, a transmitter can be part of the BS 11 and a receiver can be part of the MS 12. In the uplink, a transmitter can be part of the MS 12 and a receiver can be part of the BS 11.

There are no limits to multiple access schemes to which a wireless communication system is applied. A variety of multiple access schemes, such as Code Division Multiple Access (CDMA), Time Division Multiple Access (TDMA), Frequency Division Multiple Access (FDMA), Orthogonal Frequency Division Multiple Access (OFDMA), Single Carrier-FDMA (SC-FDMA), OFDM-FDMA, OFDM-TDMA, and OFDM-CDMA, can be used. A Time Division Duplex (TDD) method of performing uplink transmission and downlink transmission at different times or a Frequency Division Duplex (FDD) method of performing uplink transmission and downlink transmission using different frequencies can be used.

The layers of a radio interface protocol between an MS and a network can be classified into L1 (i.e., a first layer), L2 (i.e., a second layer), and L3 (i.e., a third layer) based on the three lower layers of an Open System Interconnection (OSI) reference model which is widely known in the communication system.

The physical layer belonging to the first layer provides information transfer service to a higher layer using the physical channel. The physical layer is connected to a Medium Access Control (hereinafter referred to as 'MAC') layer through a transport channel which is placed in a higher layer. Information is moved between the medium access control layer and the physical layer through the transport channel. Further, Information is moved between different physical layers (i.e., the physical layers on the transmission side and the reception side) through the physical channel. The physical channel is modulated using an OFDM (Orthogonal Frequency Division Multiplexing) method, and it uses the time and frequency as radio resources.

The MAC layer of the second layer provides service layer through a logical channel to a Radio Link Control (hereinafter referred to as 'RLC') layer which is higher than the MAC layer. The RLC layer of the second layer supports reliable data transmission. The function of the RLC layer may be implemented using a function block within the MAC layer. In such a case, the RLC layer may not exist. The PDCP layer of the second layer performs a header compression function for reducing the size of an IP packet header including relatively large and unnecessary control information so that an IP packet, such as IPv4 or IPv6, can be efficiently sent in a radio range having a small bandwidth.

A Radio Resource Control (hereinafter referred to as 'RRC') layer is related to the configuration, re-configuration, and release of a Radio Bearer (hereinafter referred to as a 'RB') and is responsible for the control of logical channels, transport channels, and physical channels. Here, the RB refers to service provided by the second layer for data transfer between an MS and an UTRAN. In the case in which RRC connection exists between the RRC of an MS and the RRC layer of a wireless network, the MS is in the RRC connected mode. In the case in which RRC connection does not exist between the RRC of an MS and the RRC layer of a wireless network, the MS is in the RRC idle mode. A Non-Access Stratum (NAS) layer placed over the RRC layer performs functions, such as session management and mobility management.

Carrier Aggregation (CA) is a type of radio configuration which provides aggregation of two or more component carriers in order to support wider transmission bandwidths up to 100 MHz. CA is also called a spectrum aggregation or a bandwidth aggregation. An individual unit carrier bound by CA is referred to as a Component Carrier or a Carrier (hereinafter referred to as a 'CC'). Each CC is defined by a bandwidth and a center frequency. The CA is used to support an increasing throughput, prevent an increase of the costs resulting from the introduction of broadband RF (radio frequency) devices, and guarantee compatibility with the existing system.

For example, assuming that 5 CCs are allocated as the granularity of a carrier unit having a bandwidth of 5 MHz, a maximum of a bandwidth of 20 MHz can be supported.

Figure 2:
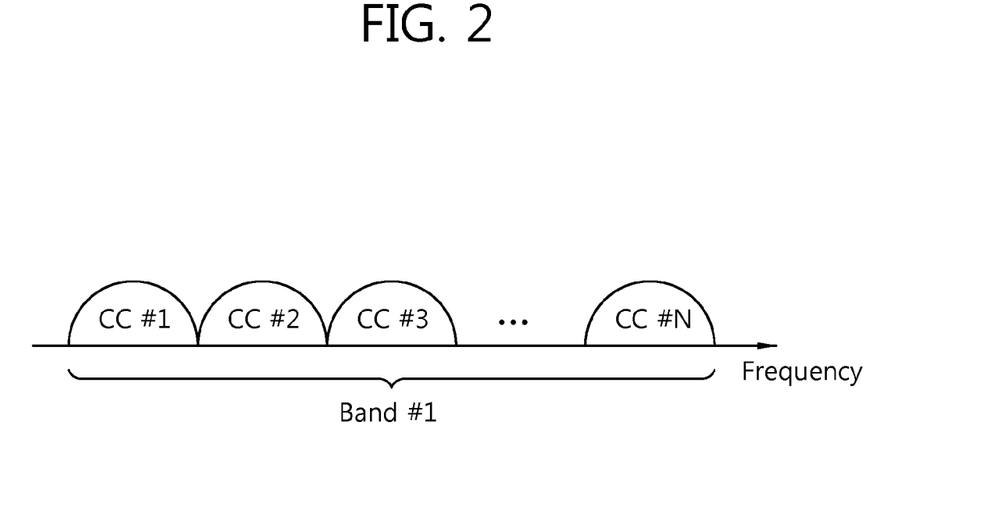
FIG. 2 is an example of the intra-band contiguous carrier aggregation
Figure 3:
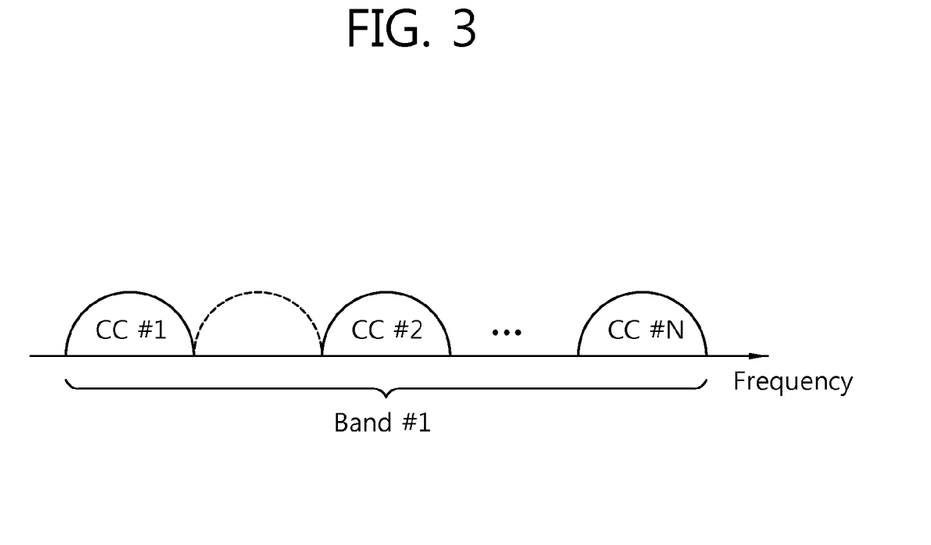
FIG. 3 is an example of the intra-band non-contiguous carrier aggregation
Figure 4:
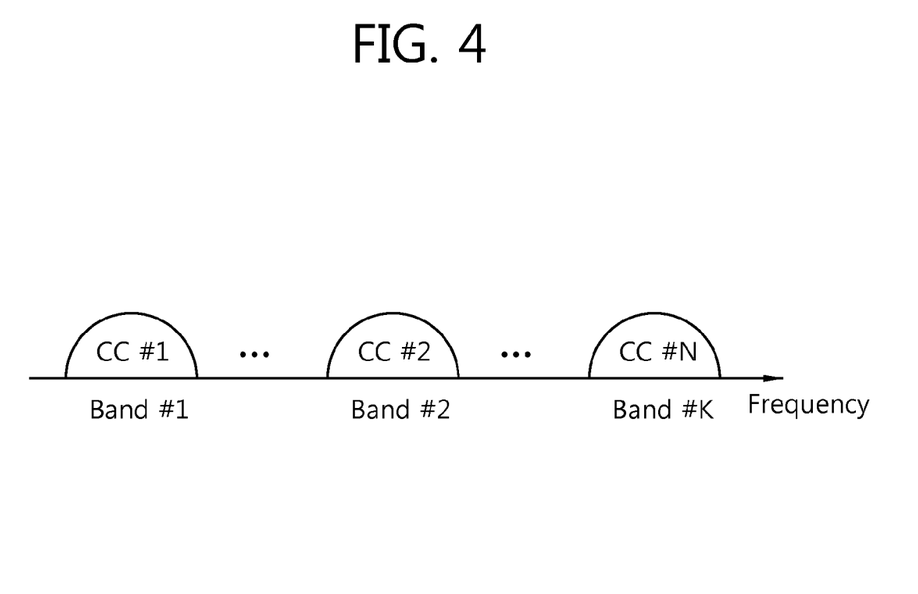
FIG. 4 is an example of the inter-band carrier aggregation.

The carrier aggregation can include the intra-band contiguous carrier aggregation such as that shown in FIG. 2, the intra-band non-contiguous carrier aggregation such as that shown in FIG. 3, and the inter-band carrier aggregation such as that shown in FIG. 4.

Referring first to FIG. 2, the intra-band contiguous carrier aggregation is performed between CCs consecutive to each other in the intra-band. For example, all CC#1, CC#2, CC#3, . . . , CC #N (i.e., aggregated CCs) are consecutive to each other.

Referring to FIG. 3, the intra-band non-contiguous carrier aggregation is performed between discontinuous CCs. For example, CC#1 and CC#2 (i.e., aggregated CCs) are spaced apart from each other with a specific frequency interposed therebetween.

Referring to FIG. 4, in the inter-band carrier aggregation, one or more of a plurality of CCs are aggregated on another frequency band. For example, a CC #1 (i.e., an aggregated CC) can exist in a band #1 and a CC #2 can exist in a band #2.

The number of aggregated downlink CCs and the number of aggregated uplink CCs can be differently configured. A case in which the number of downlink CCs is identical to the number of uplink CCs is called a symmetric aggregation, and a case in which the number of downlink CCs is different from the number of uplink CCs is called an asymmetrical aggregation.

Further, CCs can have different sizes (i.e., bandwidths). For example, assuming that 5 CCs are used to construct a 70 MHz band, the construction can include, for example, 5 MHz CC (carrier #0)+20 MHz CC (carrier #1)+20 MHz CC (carrier #2)+20 MHz CC (carrier #3)+5 MHz CC (carrier #4).

Hereinafter, a multiple carrier system refers to a system supporting the carrier aggregation. In the multiple carrier system, a contiguous carrier aggregation or a non-contiguous carrier aggregation or both can be used. Further, either a symmetrical aggregation or an asymmetrical aggregation can be used.

Figure 5:
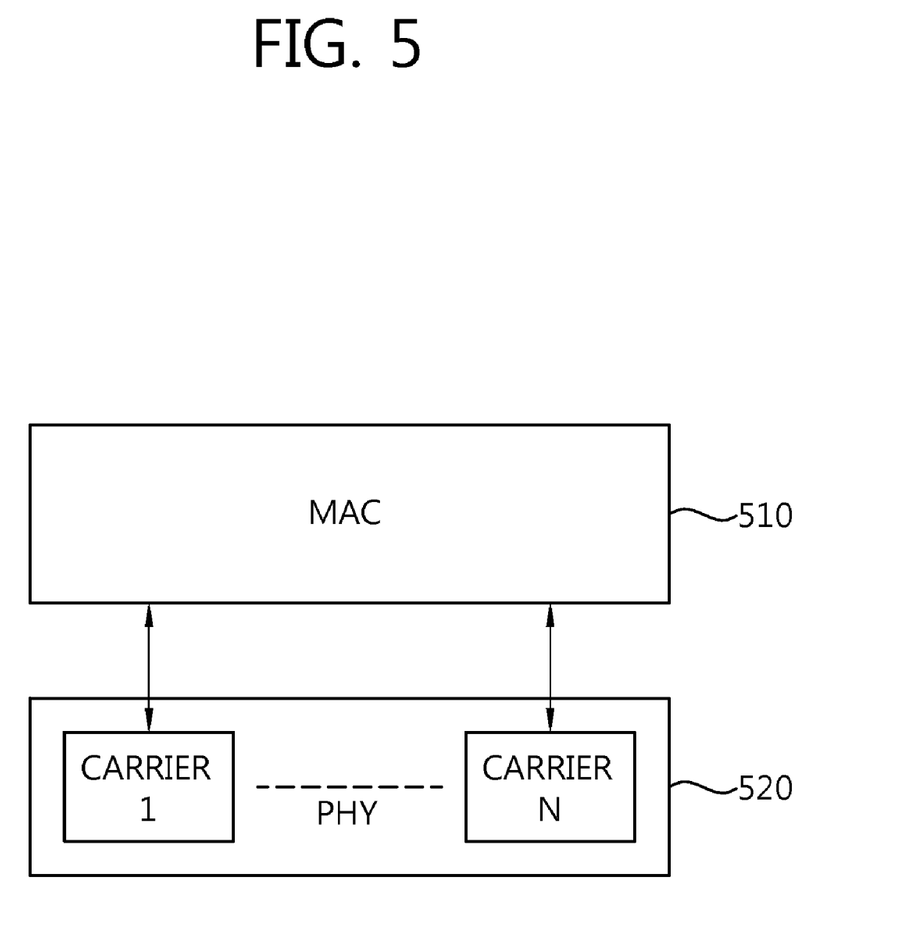
FIG. 5 is a diagram showing an example of a protocol structure for supporting multiple CCs.

FIG. 5 is a diagram showing an example of a protocol structure for supporting multiple CCs.

Referring to FIG. 5, a common MAC entity 510 manages a physical layer 520 which uses a plurality of CCs. A MAC management message transmitted through a specific CC can be applied to other CCs. That is, the MAC management message can control other CCs including the specific CCs. The physical layer 520 can be operated according to a TDD or a FDD or both.

Several physical control channels are used in the physical layer 520. A Physical Downlink Control Channel (PDCCH) used to transmit physical control information informs an MS of the resource allocation of a PCH (paging channel) and a downlink shared channel (DL-SCH) and Hybrid Automatic Repeat Request (HARQ) information related to the DL-SCH. The PDCCH also carries an uplink grant informing an MS of the allocation of resources, MCS level and uplink power control information, etc. for uplink transmission.

A Physical Control Format Indicator Channel (PCFICH) is used to inform an MS of the number of OFDM symbols used in PDCCHs and transmitted every frame. A Physical Hybrid ARQ Indicator Channel (PHICH) carries HARQ ACK/NAK signals in response to uplink transmission. A Physical Uplink Control Channel (PUCCH) carries HARQ ACK/NAK signals for downlink transmission, a scheduling request, and uplink control information such as a Channel Quality Indicator (CQI). A Physical Uplink Shared Channel (PUSCH) carries an UL-SCH (uplink shared channel).

Figure 6:
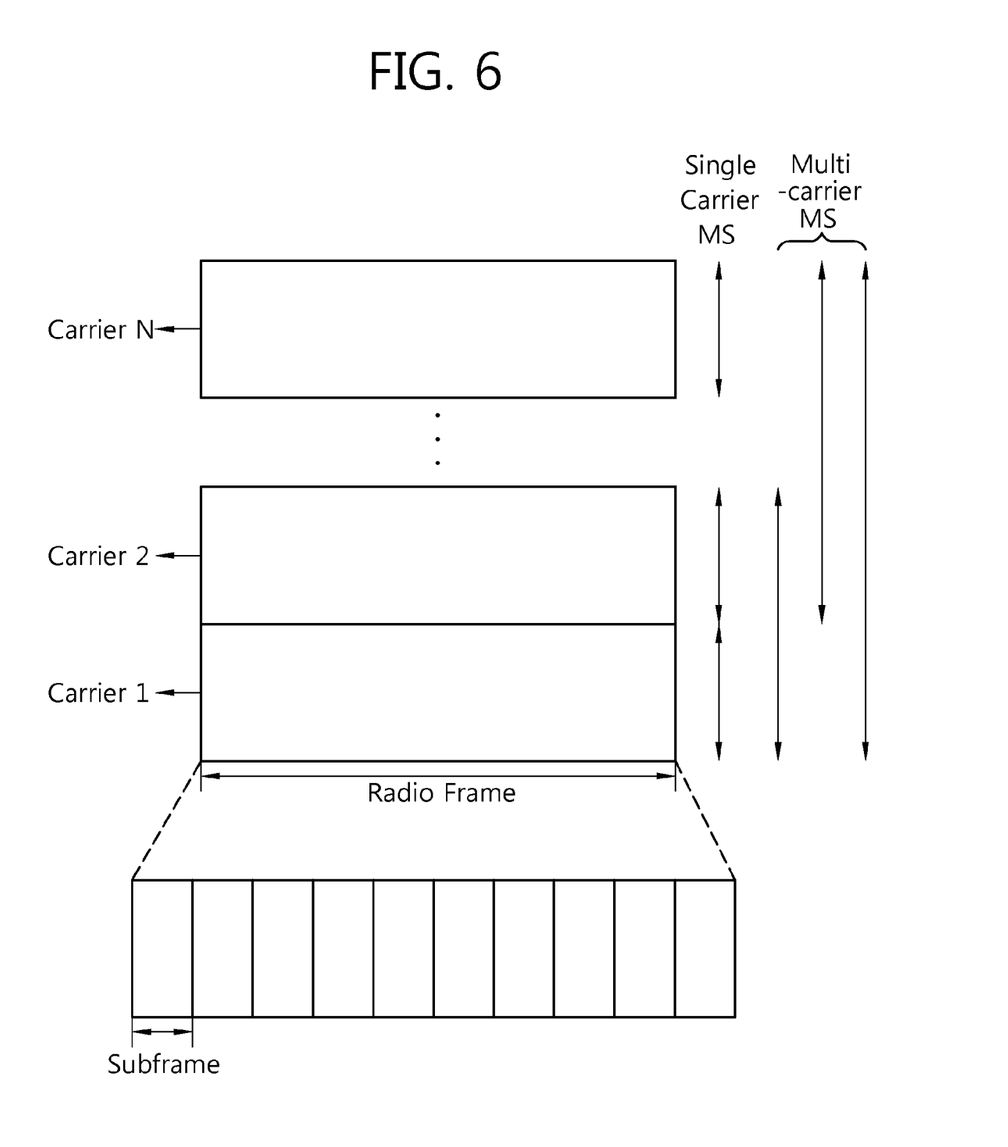
FIG. 6 is a diagram showing an example of a frame structure for a multiple component carrier operation.

FIG. 6 is a diagram showing an example of a frame structure for a multiple component carrier operation.

Referring to FIG. 6, a radio frame consists of 10 subframes. Each of the subframes includes a plurality of OFDM symbols. Each CC can have its own control channel (e.g., a PDCCH). The CCs may be contiguous to each other or may not be contiguous to each other. An MS can support one or more CCs according to its capability.

CCs can be classified into a Primary Component Carrier (hereinafter referred to as a 'PCC') and a Secondary Component Carrier (hereinafter referred to as an 'SCC') whether it is activated. The PCC is always activated, and the SCC is activated or deactivated according to specific conditions.

The term 'activation' means that traffic data are being transmitted or received or are in a ready state. The term 'deactivation' means that the transmission or reception of traffic data is impossible, but measurement or the transmission or reception of minimum information is possible.

An MS can use only one PCC or can use one or more SCCs together with the PCC. A PCC or a SCC or both can be allocated to an MS by a BS. The PCC can be used for an MS to enter a network or used to allocate an SCC or both. A carrier set to an SCC can also be changed to a PCC.

Figure 7:
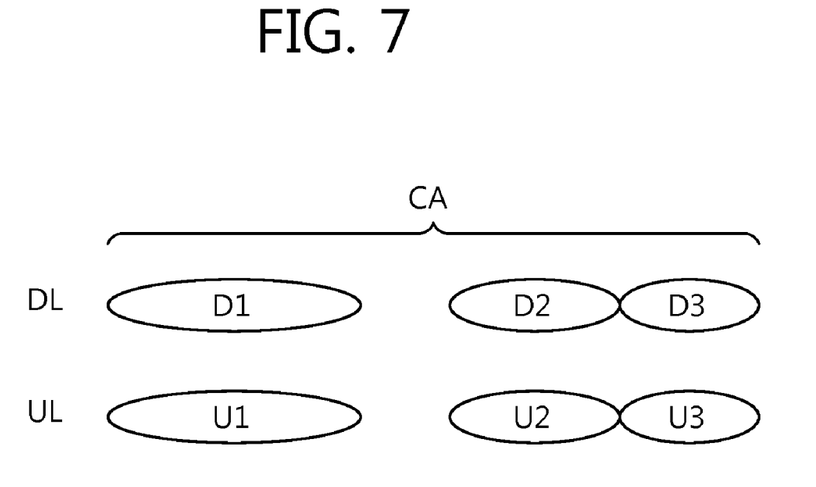
FIG. 7 is a diagram showing a linkage between a downlink component carrier and an uplink component carrier in a multiple carrier system.

FIG. 7 is a diagram showing a linkage between a downlink component carrier and an uplink component carrier in a multiple carrier system.

Referring to FIG. 7, in downlink, Downlink Component Carriers (hereinafter referred to as 'DL CC') D1, D2, and D3 are aggregated. In uplink, Uplink Component Carriers (hereinafter referred to as 'UL CC') U1, U2, and U3 are aggregated. Here, Di is an index of a DL CC, and Ui is an index of an UL CC (where i=1, 2, 3). At least one DL CC is a PCC, and the remaining DL CCs are SCCs. Likewise, at least one UL CC is a PCC and the remaining UL CCs are SCCs. For example, D1 and U1 can be PCCs, and D2, U2, D3, and U3 can be SCCs.

In an FDD system, a DL CC and an UL CC are linked to each other in a one-to-one manner. D1 is linked to U1, D2 is linked to U2, and D3 is linked to U3 in a one-to-one manner. An MS links DL CCs and an UL CC through system information transmitted by a logical channel BCCH or an RRC message dedicated for an MS, transmitted by a DCCH. Each link may be set up in a cell-specific manner or an MS-specific manner.

Examples of an UL CC linked to a DL CC are as follows.

1) UL CC through which ACK/NACK information will be transmitted by an MS with respect to data transmitted by a BS through a DL CC.

2) DL CC through which ACK/NACK information will be transmitted by a BS with respect to data transmitted by an MS through an UL CC.

3) DL CC through which a response to a Random Access Preamble (RAP) will be transmitted by a BS, the RAP being transmitted through an UL CC by an MS which starts a random access procedure.

4) UL CC to which uplink control information is applied when a BS sends uplink control information through a DL CC.

FIG. 7 illustrates only the 1:1 linkage between a DL CC and an UL CC, but a different linkage, such as 1:n or n:1, can be established. Further, the index of a CC does not always correspond to the physical order of the CC or the location of a frequency band of the corresponding CC.

In a multiple component carrier system, each idle MS can select a specific CC or cell through which radio connection between the each idle MS and a BS will be configured. For example, in the case in which radio connection to an MS is configured through a cell 2 of CC1, it may be said that the radio connection is configured through the CC1 or configured through the cell 2. Hereinafter, it is assumed that radio connection is configured in the CC dimension for consistency of description.

For the configuration or reconfiguration of a SPS, RRC signaling indicates the resource allocation interval at which the radio resources are periodically assigned. Specific transmission resource allocations in the frequency domain, and transmission attributes such as the modulation and coding scheme, are signaled using PDCCH of a CC. When the PDCCH is used to configure or reconfigure a semi-persistent schedule, it is necessary to distinguish the scheduling messages which apply to a semi-persistent scheduling from those used for dynamic scheduling. For this purpose, a special identity is used, known as the Semi-Persistent Scheduling Cell-Radio Network Temporary Identifier (SPS C-RNTI), which for each UE is different from C-RNTI used for dynamic scheduling messages.

Reconfiguration of resources used for semi-persistent scheduling can be performed when there is a transition between a silent period and talk spurt, or when the codec rate changes. For example, when the codec rate for a VoIP service is increased, a new downlink assignment message or uplink grant message can be transmitted to configure a larger persistently scheduled radio resource for the support of bigger VoIP packet.

BS can allocate semi-persistent downlink resources for the first HARQ transmission to UEs. In this case, RRC defines the periodicity of the semi-persistent downlink grant. And PDCCH indicates whether the downlink grant is a semi-persistent one i.e. whether it can be implicitly reused in the following transmission time intervals (TTIs) according to the periodicity defined by RRC.

When required, retransmissions are explicitly signaled via the PDCCH(s). In the subframes where the UE has semi-persistent downlink resource, if the UE cannot find its C-RNTI on the PDCCH(s), a downlink transmission according to the SPS that the UE has been assigned in the TTI is assumed. Otherwise, in the subframes where the UE has semi-persistent downlink resource, if the UE finds its C-RNTI on the PDCCH(s), the PDCCH allocation overrides the SPS for that TTI and the UE does not decode the semi-persistent resources.

In addition, a BS can allocate a semi-persistent uplink resource for the first HARQ transmission and potentially retransmission to UEs. In this case, RRC defines the periodicity of the semi-persistent uplink grant. And PDCCH indicates whether the uplink grant is a semi-persistent one i.e. whether it can be implicitly reused in the following TTIs according to the periodicity defined by RRC.

In the subframes where the UE has semi-persistent uplink resource, if the UE cannot find its C-RNTI on the PDCCH(s), an uplink transmission according to the SPS that the UE has been assigned in the TTI can be made. The network performs decoding of the pre-defined physical resource blocks (PRBs) according to the pre-defined MCS. Otherwise, in the subframes where the UE has semi-persistent uplink resource, if the UE finds its C-RNTI on the PDCCH(s), the PDCCH allocation overrides the SPS for that TTI and the UE's transmission follows the PDCCH allocation, not the SPS. Retransmissions are either implicitly allocated in which case the UE uses the semi-persistent uplink allocation, or explicitly allocated via PDCCH(s) in which case the UE does not follow the SPS.

Figure 8:
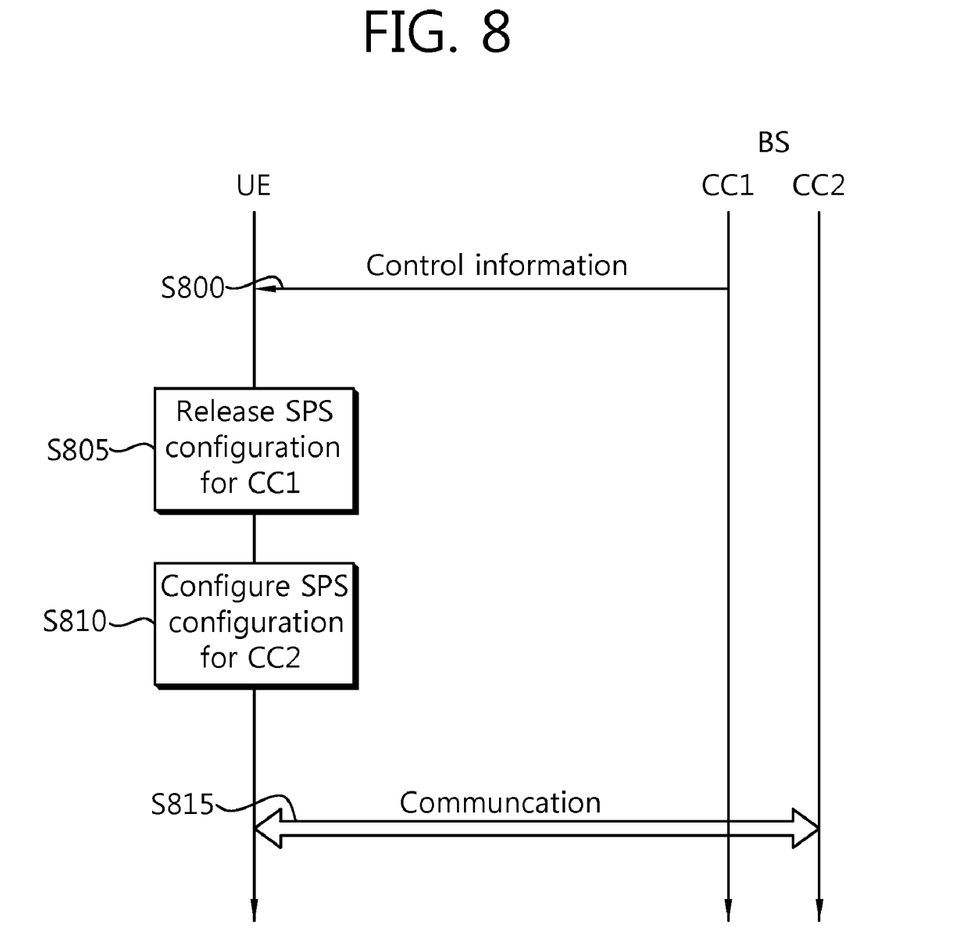
FIG. 8 shows a flowchart illustrating configuring SPS in multiple component carrier system according to an embodiment of the present invention.

FIG. 8 shows a flowchart illustrating configuring SPS in multiple component carrier system according to an embodiment of the present invention. Assume that only 2 component carriers CC1, CC2 are configured for a UE. CC1 and CC2 are either UL CCs or DL CCs.

Referring to FIG. 8, a base station (BS) transmits control information to a user equipment (UE) via CC1 S800. The control information includes an index which indexing a component carrier for SPS. The control information can be in various formats. In an embodiment of the present invention, the control information is an SPS configuration message generated by RRC layer of the BS. The SPS configuration message includes not only the index but also an SPS interval. The SPS configuration message is applied to a CC indicated by the index.

In another embodiment of the present invention, the control information is an index received via PDCCHs of CC1.

The UE releases a first SPS configuration on CC1 for first SPS data when the index indicates a CC2 S805. When the UE has the SPS configuration for CC1, if the BS configures or initiates another SPS configuration for CC2 for the UE, the UE implicitly release or deactivates the SPS configuration in CC1. Although there is no SPS configuration release procedure for CC1, SPS reconfiguration from CC1 to CC2 (either in uplink or in downlink) can be simplified and clarified by using the index.

The UE configures a second SPS configuration on CC2 S810. The second SPS configuration is based on a new SPS configuration or is the same as the first SPS configuration.

The UE and the BS communicates with each other via CC2 based on the second SPS configuration 5815.

Figure 9:
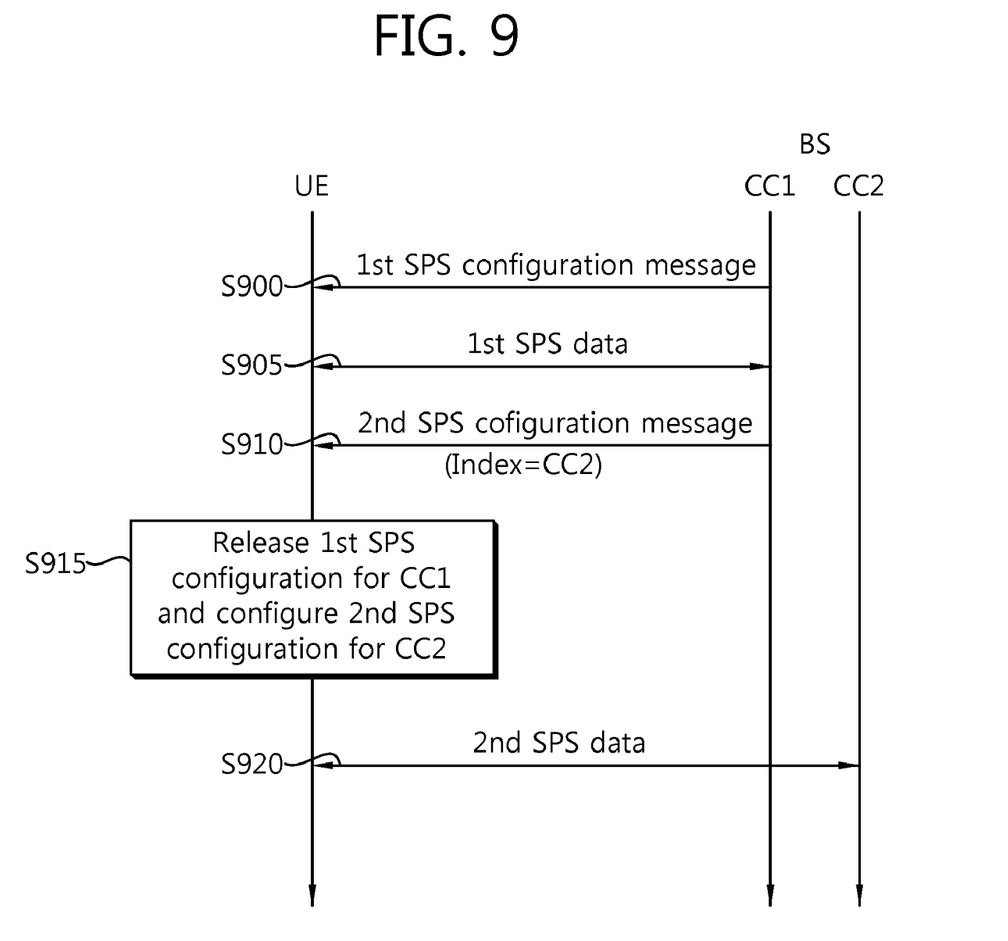
FIG. 9 shows a flowchart illustrating configuring SPS in multiple component carrier system according to another embodiment of the present invention.

FIG. 9 shows a flowchart illustrating configuring SPS in multiple component carrier system according to another embodiment of the present invention. Assume that only 2 component carriers CC1, CC2 are configured for a UE and SPS is configured for only one CC at a time.

Referring to FIG. 9, a BS transmits a first SPS configuration message to a UE via CC1 S900. The first SPS configuration message is for CC1.

First SPS data is transmitted between the UE and the BS based on a first SPS configuration defined by the first SPS configuration message S905. The first SPS configuration is indicated by DL assignment or UL grant. The first SPS data is transmitted from the UE to the BS if the CC1 is a UL CC. The first SPS data is transmitted from the BS to the UE if the CC1 is a DL CC. The first SPS data is either L1 or L2 level data. L1 level means physical layer level, and L2 level means MAC level and above.

When a second SPS configuration for CC2 is generated, the BS transmits the second SPS configuration message to the UE via CC1 S910. In an embodiment, the second SPS configuration message includes an index which indicates CC2 to which the current SPS configuration is applied and other fields as shown in Table 1. This is called Type A SPS configuration message.

TABLE 1

SPS Configuration message field descriptions

SPS C-RNTI

Semi-persistent Scheduling C-RNTI.
SPS IntervalDL

Semi-persistent scheduling interval in downlink. Value in number of sub-frames.
numberOfConfSPS-Processes The number of configured HARQ processes for Semi-Persistent Scheduling.
n1-PUCCH-AN-PersistentList TABLE 1-continued SPS Configuration message field descriptions List of parameter: $n_{PUCCH}^{(1)}$.
SPS IntervalUL Semi-persistent scheduling interval in uplink. Value in number of sub-frames. Value sf10 corresponds to 10 sub-frames, sf20 corresponds to 20 sub-frames and so on. For TDD, the UE shall round this parameter down to the nearest integer (of 10 sub-frames), e.g. sf10 corresponds to 10 sub-frames, sf32 corresponds to 30 sub-frames, sf128 corresponds to 120 sub-frames.
implicitReleaseAfter Number of empty transmissions before implicit release. Value e2 corresponds to 2 transmissions, e3 corresponds to 3 transmissions and so on.
p0-NominalPUSCH-Persistent Parameter: $P_{O\_NOMINAL\_PUSCH}(0)$. unit dBm step 1. This field is applicable for persistent scheduling, only. If choice 'setup' is used and p0-Persistent is absent, apply the value of p0-NominalPUSCH for p0-NominalPUSCH-Persistent.
p0-UE-PUSCH-Persistent Parameter: $P_{O\_UE\_PUSCH}(0)$. unit dB. This field is applicable for persistent scheduling, only. If choice 'setup' is used and p0-Persistent is absent, apply the value of p0-UE-PUSCH for p0-UE-PUSCH-Persistent.
twoIntervalsConfig Trigger of two-intervals-Semi-Persistent Scheduling in uplink. If this field is present, two-intervals-SPS is enabled for uplink. Otherwise, two-intervals-SPS is disabled.
Index Indicates a component carrier to which current SPS configuration message is applied.

Referring to Table 1, the second SPS configuration message is used to explicitly notify the UE that all fields are totally updated from the first SPS configuration.

In another embodiment, the second SPS configuration message only includes an index indicating CC2 to which the current SPS configuration is applied as shown in Table 2. This is called Type B SPS configuration message.

TABLE 2

SPS Configuration message field descriptions

Index

Indicates a component carrier to which current SPS configuration message is applied.

Referring to Table 2, the second SPS configuration message is used to implicitly notify the UE that all fields are totally the same as the first SPS configuration. In UE's perspective, if UE receives Type A SPS configuration message, the UE updates all the parameters based on the fields in the new SPS configuration message. On the contrary, if UE receives Type B SPS configuration message, the UE reuses all the existing parameters based on the fields in the previously received SPS configuration message which were applied to CC1.

The UE releases SPS configuration for CC1 without any explicit indication for releasing the first SPS configuration and configures a new SPS configuration for CC2 based on the second SPS configuration message, unless the BS explicitly indicates keeping the first configuration on CC1 S915.

Second SPS data is transmitted between the UE and the BS using the second SPS configuration defined by the second SPS configuration message S920. The second SPS data is transmitted from the UE to the BS if the CC1 is a UL CC. The second SPS data is transmitted from the BS to the UE if the CC1 is a DL CC. The second SPS data is either L1 or L2 level data.

Figure 10:
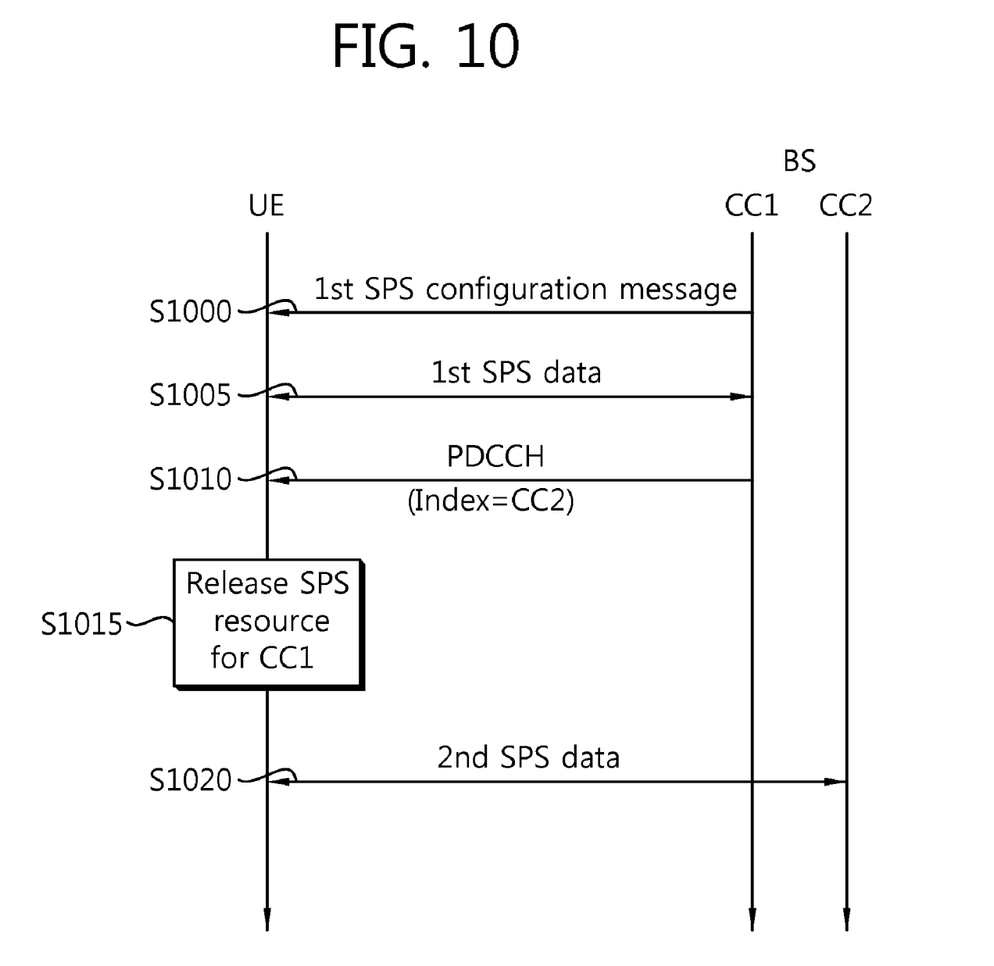
FIG. 10 shows a flowchart illustrating configuring SPS in multiple component carrier system according to yet another embodiment of the present invention.

FIG. 10 shows a flowchart illustrating configuring SPS in multiple component carrier system according to another embodiment of the present invention. Assume that 2 component carriers CC1, CC2 are configured for a UE and SPS is configured for more than two CCs at a time.

Referring to FIG. 10, a BS transmits a first SPS configuration message to a UE via CC1 S1000. The first SPS configuration message is for both CC1 and CC2. The BS configures more than two CCs for SPS and so the UE can receive/transmit SPS data through one CC or the other CC. The same RRC SPS configuration such as SPS interval is applied to either one CC or the other CC.

First SPS data is transmitted between the UE and the BS using a first SPS configuration defined by the first SPS configuration message via CC1 S1005. The first SPS configuration is indicated by DL assignment or UL grant. The first SPS data is transmitted from the UE to the BS if the CC1 is a UL CC. The first SPS data is transmitted from the BS to the UE if the CC1 is a DL CC. The first SPS data is either L1 or L2 level data.

The BS transmits a PDCCH with an index via CC1 S1010. The PDCCH comprises one of control information and an index indexing CC2 to which the current SPS configuration is applied. PDCCH transmits downlink control information (DCI) that has a different format in different usage. Table 3 shows various types of a DCI format.

TABLE 3

| DCI Format | Description |
| --- | --- |
| 0 | used for the scheduling of PUSCH (Uplink grant) |
| 1 | used for the scheduling of one PDSCH codeword |
| 1A | used for the compact scheduling of one PDSCH codeword and random access procedure initiated by a PDCCH order |
| 1B | used for the compact scheduling of one PDSCH codeword with precoding information |
| 1C | used for very compact scheduling of one PDSCH codeword and notifying MCCH change |

TABLE 3-continued

| DCI Format | Description |
|---|---|
| 1D | used for the compact scheduling of one PDSCH codeword with precoding and power offset information |
| 2 | used for scheduling PDSCH to UEs configured in spatial multiplexing mode |
| 2A | used for scheduling PDSCH to UEs configured in large delay CDD mode |
| 3 | used for the transmission of TPC commands for PUCCH and PUSCH with 2-bit power adjustments |
| 3A | used for the transmission of TPC commands for PUCCH and PUSCH with single bit power adjustments |

Referring to Table 3, DCI format 0 indicates uplink resource allocation information, which is also referred to as an uplink grant. Each field of DCI is sequentially mapped to information bits. For example, assume DCI is mapped to 44 bit-length information bits, resource allocation field in the DCI is mapped to $10^{th}$ through $23^{rd}$ bits. Downlink resource allocation information is also referred to as a downlink grant.

Table 4 shows an example of DCI format 0.

TABLE 4

Resource allocation header (resource allocation type 0/type 1) – 1 bit
    If downlink bandwidth is less than or equal to 10 PRBs, there is no resource allocation header and resource allocation type 0 is assumed.
Resource block assignment:
    For resource allocation type 0
        $\lceil N_{RB}^{DL}/P \rceil$ bits provide the resource allocation
    For resource allocation type 1
        $\lceil \log_2(P) \rceil$ bits of this field are used as a header specific to this resource allocation type to indicate the selected resource blocks subset
        1 bit indicates a shift of the resource allocation span
        $(\lceil N_{RB}^{DL}/P \rceil - \lceil \log_2(P) \rceil - 1)$ bits provide the resource allocation
    where the value of P depends on the number of DL resource
Modulation and coding scheme and redundancy versiion - 5 bits
HARQ process number - 3 bits (FDD), 4 bits (TDD)
New data indicator - 1 bit
Redundancy version - 2 bits
CFI for PDCCH of a secondary component carrier, or TPC command for scheduled PUCCH - 2 bits
Indicator for indicating index of a component carrier for SPS
Downlink Assignment Index (this field is present in TDD for all the uplink -downlink configurations and only applies to TDD operation with uplink -downlink configuration 1-6. This field is not present in FDD) - 2 bits Referring to Table 4, DCI format 0 includes several fields. Especially, DCI format 0 includes an index for indicating index of a component carrier for SPS. In FIG. 10, the index indicates CC2.

The PDCCH is masked by an identifier. One example of the identifier is radio network temporary identifier (RNTI). When the PDCCH contains DCI format 0 which includes the index, the RNTI masked on the PDCCH is called SPS-RNTI or SPS-C-RNTI. The UE monitors PDCCHs by de-masking the PDCCHs with the SPS-RNTI and if a PDCCH is masked by the same SPS-RNTI, then the UE can successfully receive the PDCCH.

When PDCCH with SPS-RNTI initiates/re-initiates a DL assignment or an UL grant for SPS transmission, the DCI on the PDCCH also indicates which CC a radio resource (i.e. the DL assignment or the UL grant) is initiated/re-initiated for SPS transmission on (i.e. a CC index).

If PDCCH with SPS-RNTI initiates/re-initiates a radio resource for SPS transmission on CC2 while another radio resource is still active for SPS transmission on CC1 with the first SPS configuration, the UE corresponding to SPS-RNTI implicitly releases the radio resource for SPS transmission on CC1 and initiates/re-initiates the radio resource for SPS transmission on CC2 while keeping the first SPS configuration S1015. In this case, the UE stops receiving data from the SPS resource on DL CC1.

Second SPS data is transmitted between the UE and the BS using a first SPS allocation defined by the first SPS configuration message via CC1 S1020.

Furthermore, when PDCCH with SPS-RNTI indicates a DL assignment or an UL grant for SPS retransmission, the index in the PDCCH can also indicate which CC the DL assignment or the UL grant is used for the SPS retransmission on, even though SPS is released (or deactivated) on the CC that the PDCCH indicates for SPS retransmission. For instance, in the example shown in FIG. 10, even if SPS is released (or deactivated) on DL CC1, when PDCCH with SPS-RNTI indicates DL CC1 as well as a SPS resource for SPS retransmission, the UE temporarily receives SPS retransmission from the SPS resource on DL CC1 and turns back to DL CC2 for SPS (re)transmission.

The aforementioned functions can be executed by processors such as microprocessors, controllers, microcontrollers, application specific integrated circuits (ASICs) and so on according to software or program codes coded to execute the functions. The design, development and implementation of the codes are obvious to those skilled in the art.

While the present invention has been particularly shown an described with reference to exemplary embodiments thereof, it will be understood by those of ordinary skill in the art that various changes in form and details may be made therein without departing from the spirit and scope of the present invention as defined by the following claims.

What is claimed is:

1. A method of receiving semi-persistent scheduling (SPS) data performed by a user equipment (UE) in a multi-carrier system, the method comprising:
    applying a first SPS configuration for first SPS data on a first carrier;
    receiving the first SPS data on the first carrier using the first SPS configuration;
    receiving, on the first carrier, information on a second carrier for second SPS data, the second carrier being different from the first carrier; and
    receiving the second SPS data on the second carrier.

2. The method of claim 1, further comprising releasing the first SPS configuration on the first carrier.

3. The method of claim 2, further comprising stopping receiving the first SPS data on the first carrier.

4. The method of claim 3, wherein the first SPS data is different from the second SPS data.

5. The method of claim 1, wherein the information on the second carrier comprises a second SPS configuration for the second SPS data.

6. The method of claim 5, wherein the first SPS configuration has a same SPS interval as the second SPS configuration.

7. The method of claim 1, wherein the information on the second carrier comprises:
an index indexing the second carrier; and
an empty SPS configuration.

8. The method of claim 1, wherein the information on the second carrier comprises an index indexing the second carrier.

9. The method of claim 8, wherein a SPS-Cell Radio Network Temporary Identifier (SPS-CRNTI) is received through a physical downlink control channel (PDCCH) with the index.

10. A method of transmitting semi-persistent scheduling (SPS) data performed by a network in a multi-carrier system, the method comprising:
transmitting a first SPS configuration for first SPS data on the first carrier;
transmitting the first SPS data on the first carrier using the first SPS configuration;
transmitting, on the first carrier, information on a second carrier for second SPS data, the second carrier being different from the first carrier; and
transmitting the second SPS data on the second carrier.

11. The method of claim 10, wherein the information on the second carrier comprises a second SPS configuration for the second SPS data.

12. The method of claim 11, wherein the first SPS configuration has a same SPS interval as the second SPS configuration.

13. The method of claim 10, wherein the information on the second carrier comprises:
an index indexing the second carrier; and
an empty SPS configuration.

14. The method of claim 10, wherein the information on the second carrier comprises an index indexing the second carrier.

15. The method of claim 14, wherein a SPS-Cell Radio Network Temporary Identity (SPS-CRNTI) is transmitted through a physical downlink control channel (PDCCH) with the index.

* * * * *